United States Patent [19]

Homer

[11] Patent Number: 4,471,800

[45] Date of Patent: Sep. 18, 1984

[54] VALVES

[75] Inventor: Arthur J. Homer, Selcourt Springs, South Africa

[73] Assignee: Erling Magnus Johannesen, Transvaal, South Africa

[21] Appl. No.: 390,651

[22] Filed: Jun. 21, 1982

[30] Foreign Application Priority Data

Jun. 19, 1981 [ZA] South Africa ............ 81/4175

[51] Int. Cl.³ .............. F16K 43/00; F16K 31/26
[52] U.S. Cl. .................... 137/315; 137/413;
    137/438; 137/443; 251/25; 251/322; 251/323
[58] Field of Search ............ 137/438, 403, 315, 413,
    137/443, 454.5; 251/214, 25, 322, 323

[56]     References Cited
       U.S. PATENT DOCUMENTS 545,348  8/1895  Crawford et al. ............ 137/438
547,384 10/1895  Rawe ........................ 137/438
947,106  1/1910  Kirk ........................ 137/443
4,094,327 6/1978 Brandelli ................... 137/403

FOREIGN PATENT DOCUMENTS 137323 12/1901 Fed. Rep. of Germany ...... 137/438

Primary Examiner—George L. Walton
Attorney, Agent, or Firm—Scully, Scott, Murphy & Presser

[57]      ABSTRACT

A float controlled valve comprises a chamber with aligned openings, a detachable cap carrying a sealing washer on one opening and a tube arranged to move under the action of the float in the second opening with a seal ring sealing it. The sealing ring is located in position by means of a detachable holding element accessible when the cap is off. Thus the sealing washer and the sealing ring may be replaced after the removal of the cap.

6 Claims, 4 Drawing Figures

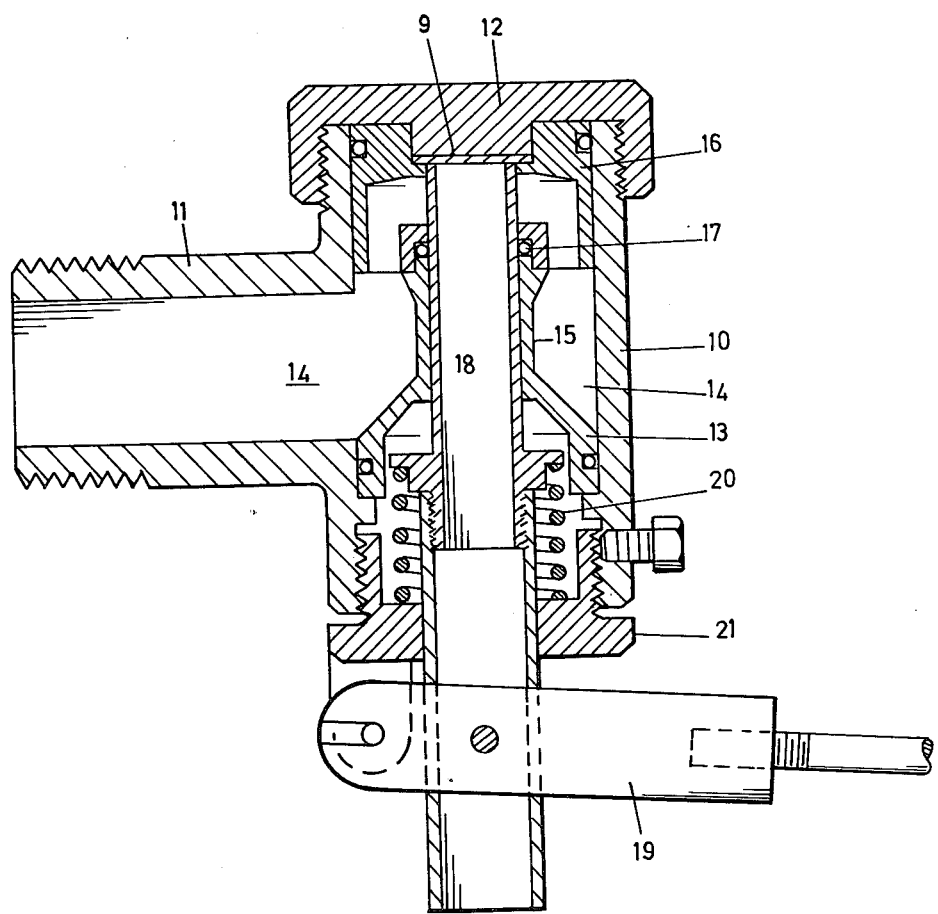
FIG_1

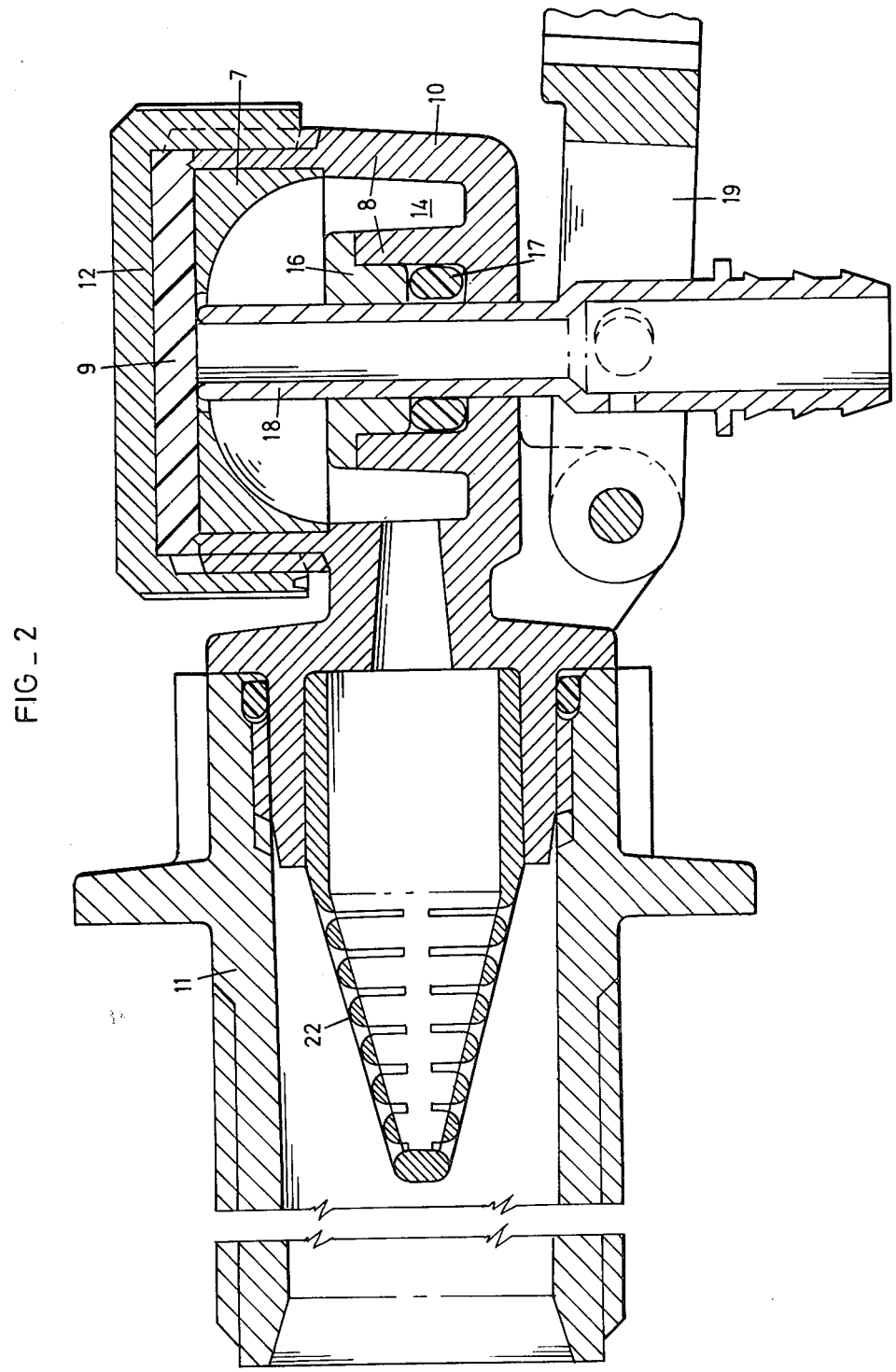
FIG_2

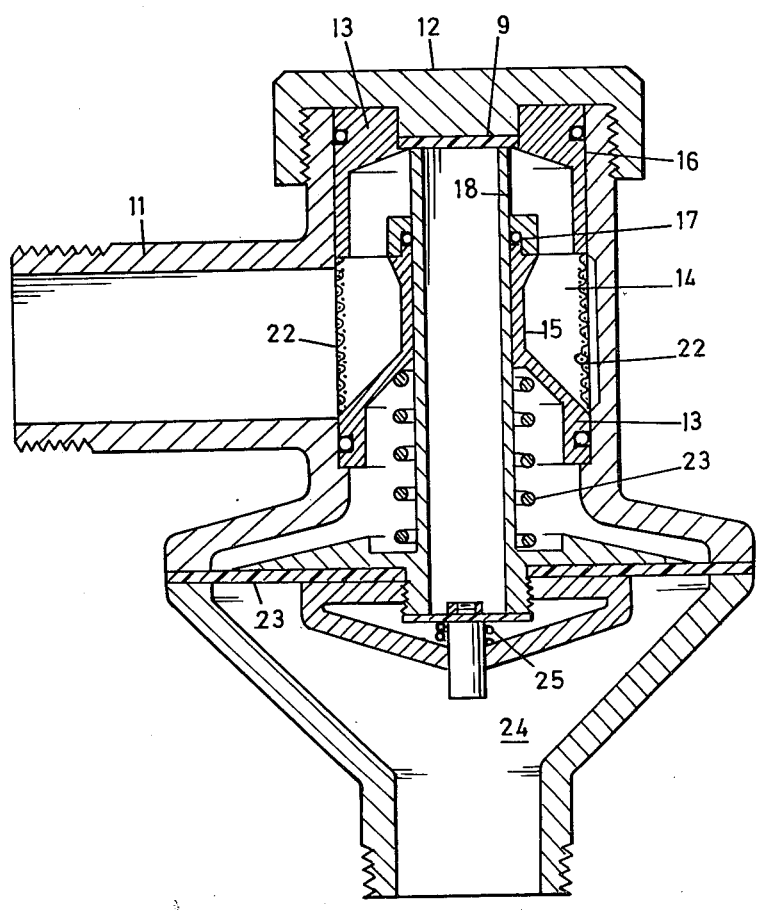
FIG_3

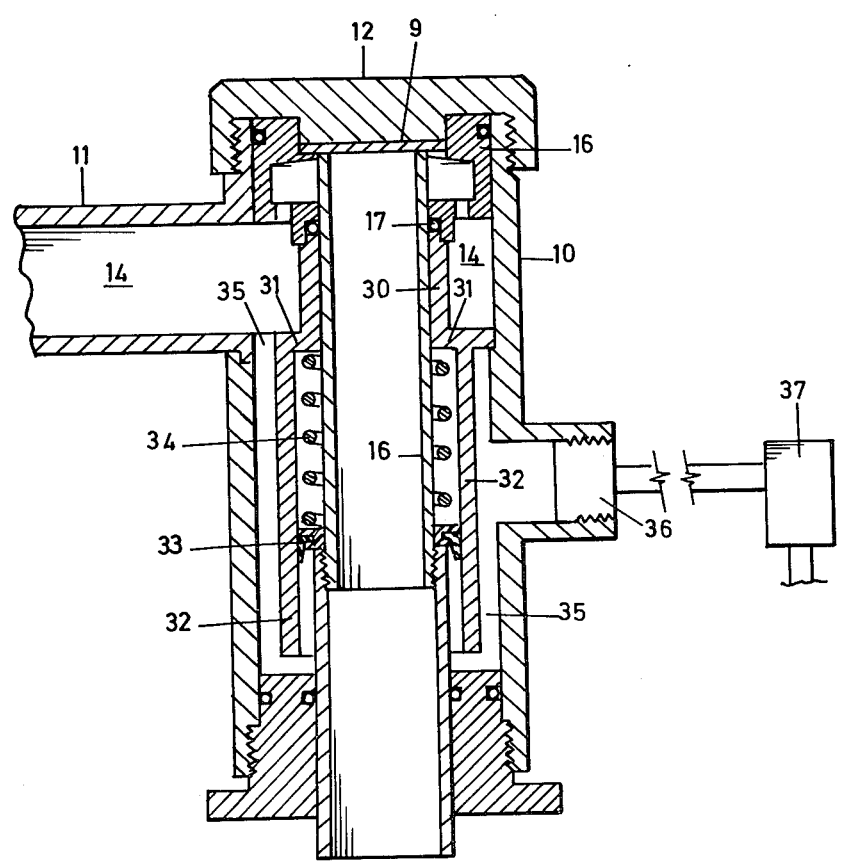
FIG_4

VALVES

BACKGROUND OF THE INVENTION

This invention relates to valves.

A variety of valve types are known. Most conventional types rely on a movable valve member that seals off an orifice or valve seat in the closed position while it moves off the seat during opening to allow flow through the orifice During closure the member is acted on by the pressure of the fluid so that the member has to press on its seat with a force which outbalances the pressure acting on the member and this force is constantly applied to the seat during closure.

Especially with float controlled valves this is a disadvantage. The larger the orifice and hence the force to be outbalanced, the larger the float and its lever arm have to be.

In many cases it would be an advantage to have a closure member held on a seat by means of a force which is independent of the pressure of the fluid to be controlled.

SUMMARY OF THE INVENTION

A valve according to the invention comprises:
a chamber, first and second axially aligned openings to the chamber,
a third opening to the chamber constituting an inlet,
a detachable cap closing the first opening,
a sealing washer detachably carried by the cap,
a tube arranged to move axially in the second opening between a first position in which its inner mouth abuts the sealing washer and positions in which fluid in the chamber may flow out of the chamber along the tube,
a sealing ring around the tube preventing leakage of fluid from the chamber along the outside of the tube, and
a detachable locating element holding the sealing ring in position, which element can be replaced through the first opening to allow for replacement of the sealing ring.

The sealing ring is preferably torroidal.

Thus with the valve of the invention it matters little whether the sealing washer or the sealing ring wears out first. Both can be replaced by removing the same detachable cap, which is preferably secured over the first opening by a screw threaded engagement Axial movement of the tube may be caused by a variety of devices such as a lever arm of a float, a diaphragm of the kind used in pressure control valves, by a double acting piston and cylinder arrangement and the like.

DESCRIPTION OF THE DRAWINGS

FIG. 1 is a section through a float controlled valve according to the invention, FIG. 2 is a section through a modified version of a float controlled valve, FIG. 3 is a section through a pressure control valve according to the invention, and FIG. 4 is a section through a pilot operated valve according to the invention.

DESCRIPTION OF EMBODIMENTS

In FIG. 1 there is a cylindrical valve body 10 provided with an inlet 11. The top of the body 10 is closed by means of a screw cap 12. The cap 12 holds in position an insert 13 which seals off the bottom of the chamber 14 inside the body 10 and provides a centrally holed boss 15, and a locating member 16 holding in position an O-ring 17.

A tube 18 constitutes the valve member and slides inside the boss 15 and is sealed on its outside by means of the O-ring 17. Between the cap 12 and the member 16 there is a washer 9 against which the inner mouth of the tube 18 seals on closure.

It will be seen that in the illustrated position there can be no flow from the chamber 14 to the interior of the tube 18. If the tube 18 is moved down, flow from the chamber 14 takes place through the tube 18.

In this embodiment the tube is moved by means of the lever arm 19 of a float (not shown). Upward movement of the tube 18 is assisted by means of a spring 20, but this spring is not essential to the working of the device. The spring 20 is held in place by means of a cap 21 on which the lever arm 19 is also pivoted as shown. A grub screw 6 holds the cap 21 in any angular position to which it has been adjusted to give the float a free moving action.

Opening of the valve of FIG. 1 is resisted only by the spring 20 (which need not be there) while closure is resisted only by the forces of gravity. A relatively small float and a short lever arm 19 can effect closure of almost any size valve. In the closed position, the force holding the mouth of the tube 18 against the washer 9 is not dependent on the pressure inside the chamber 14.

In the illustrated embodiment it is a simple matter to replace the washer 9 or the O-ring 17. This is done simply by unscrewing the cap 12 and in the case of the O-ring 17 removing the element 16. There is no reason to interfere with the pivots of the lever arm 19 as is the case with conventional float valves when worn washers have to be replaced.

FIG. 2 illustrates a simplified of the valve shown in FIG. 1

In this case the washer 9 not only acts as a seat but also seals the cap 12 to the body 10. Also there is no insert to provide a centrally holed boss, but the tube 18 passes through the floor of the bofy 10 which also provides the pivot point for the lever arm 19. A screen 22 is provided in the inlet 11.

In this case the O-ring 17 is held in position by means of a locating element which is a press fit in a holed boss 8 upstanding from the floor of the body 10. The washer 9 is replaced merely by removing the cap 12, while with the cap 12 off the element 16 may be lifted out and the O-ring 17 replaced, if this is necessary.

An additional insert 7 is provided to support the washer 9 against possible sagging.

In the embodiment of FIG. 3 parts which are the same have the same reference numerals as in FIG. 1. At the top the only addition is that a filter screen 22 surrounds the chamber 14 as is usual with pressure control valves.

In this case the tube 18 is conrolled by means of a diaphragm 23 to which the lower end of the tube 18 is secured. The diaphragm 23 is positioned at one end of an outlet chamber 24 and is biased towards that chamber by means of a spring 23. If the pressure in the chamber 24 is more than the spring pressure, the diaphragm 23 moves to push the tube 18 on to the washer 9. If the pressure in the chamber 24 drops, the spring causes the tube 18 to move off the washer 9 and flow can take place from the inlet 11 to the outlet chamber 24.

The open lower end of the tube 16 is controlled by a spring biased mushroom valve 25 to prevent flow of fluid in the opposite direction along the tube 18.

In the embodiment of FIG. 4 the body 10 is formed in its interior with a boss 30 to take the seal 17 around the tube 18 and has a floor 31. Depending from the floor 31 is a cylindrical skirt 32. A piston 33 on the tube 18 moves in the skirt 32 and is downwardly biased by means of a spring 34. A bleed hole 35 connects the chamber 14 with the space 35 around the skirt 32. A port 36 connects with the space 35.

The spring 34 is so chosen that at the inlet pressure of the fluid being controlled the tube 18 is pressed against the washer 9. If the pressure in the space 35 drops, the spring forces the tube 16 down and fluid flows along the tube 16.

As shown diagrammatically the port 36 is connected to a float controlled valve 37, which may be a valve such as that illustrated in FIG. 1 and or FIG. 2. The valve 37 is positioned in any suitable quiescent body of the liquid being handled and thus operates the larger valve which has been illustrated.

The valve 37 may be replaced by a suitable push-button valve so that the valve illustrated in FIG. 3 may become a flushing valve.

In all embodiments the washer 9 and the O-ring 17 may be replaced with ease by unscrewing the cap 12.

I claim:

1. A valve comprising:
   a chamber,
   first and second axially aligned openings to the chamber, a third opening to the chamber constituting an inlet,
   a detachable cap closing the first opening,
   a sealing washer detachably carried by the cap,
   a tube arranged to move axially in the second opening between a first position in which its inner mouth abuts the sealing washer and positions in which fluid in the chamber may flow out of the chamber long the tube,
   a sealing ring around the tube preventing leakage of fluid from the chamber along the outside of the tube, and
   a detachable locating element holding the sealing ring in position at a location adjacent the cap, which element can be replaced through the first opening after the removal of the cap to allow for replacement of the sealing ring without disturbing any of the other valve elements.

2. The valve claimed 1 in which the sealing ring is torroidal.

3. The valve claimed in either of claims 1 or 2 in which the tube is carried by a diaphragm.

4. The valve claimed in either of claims 1 or 2 in which the tube is caused to move under fluid pressure.

5. The valve claimed in claim 1 in which the cap is a screw cap.

6. The valve of either one of claims 1 or 2 and including a lever arm connected pivotally to the tube and to a fixed part of the valve, and a float carried by the arm for floating at the surface of a body of liquid and for pivoting the arm to cause axial movement of the tube in dependence on the level of liquid in the body.

* * * * *

UNITED STATES PATENT OFFICE
CERTIFICATE OF CORRECTION

Patent No. 4,471,800          Dated September 18, 1984

Inventor(s) Homer

It is certified that error appears in the above-identified patent and that said Letters Patent are hereby corrected as shown below:

Column 2, line 37 after "simplified" insert --version--.

Column 2, line 42 "bofy" should be --body--.

Column 4, line 10 "long" should be --along--.

Signed and Sealed this

Second Day of April 1985

[SEAL]

Attest:

DONALD J. QUIGG

Attesting Officer   Acting Commissioner of Patents and Trademarks

UNITED STATES PATENT AND TRADEMARK OFFICE
CERTIFICATE OF CORRECTION

PATENT NO. : 4,471,800
DATED : September 18, 1984
INVENTOR(S) : Arthur J. Homer

It is certified that error appears in the above–identified patent and that said Letters Patent are hereby corrected as shown below:

On the title page:
The proper assignee should be changed from "Erling Magnus Johannesen, 188 Columbine Avenue, Mondeor, Johannesburg, Transvaal, South Africa" to --Marley Plumbing (Proprietary) Limited, Elandsfontein, South Africa --.

Signed and Sealed this

Twenty-third Day of April 1985

[SEAL]

Attest:

DONALD J. QUIGG

*Attesting Officer*  *Acting Commissioner of Patents and Trademarks*